United States Patent [19]

Le Breton

[11] Patent Number: 5,485,682
[45] Date of Patent: Jan. 23, 1996

[54] OPTO-MECHANICAL INSTRUMENT TO ACCURATELY MEASURE LINEAR DISTANCES ON FLAT OR CURVED SURFACES

[76] Inventor: Guy C. Le Breton, 1008 N. Oak Park Ave., Oak Park, Ill. 60302

[21] Appl. No.: 350,888

[22] Filed: Dec. 7, 1994

[51] Int. Cl.[6] ............................................. G01B 3/12
[52] U.S. Cl. .................................. 33/773; 33/701
[58] Field of Search ............................ 33/773, 772, 775, 33/779, 780, 1 PT, 701, 706, 707

[56] References Cited

U.S. PATENT DOCUMENTS

| | | | |
|---|---|---|---|
| 3,494,039 | 2/1970 | Porter | 33/773 |
| 4,760,647 | 8/1988 | Gillis . | |
| 4,914,831 | 4/1990 | Kanezashi et al. | 33/780 |
| 5,067,249 | 11/1991 | Terrigno | 33/773 |
| 5,161,313 | 11/1992 | Rijlaarsadam | 33/773 |

FOREIGN PATENT DOCUMENTS

| | | | |
|---|---|---|---|
| 3245864 | 5/1978 | Germany | 33/779 |
| 3025686 | 2/1982 | Germany | 33/772 |
| 2751620 | 6/1984 | Germany | 33/780 |
| 58-101105 | 6/1983 | Japan . | |
| 60-36901 | 2/1985 | Japan . | |
| 11901010 | 8/1989 | Japan . | |
| 2200754 | 8/1988 | United Kingdom | 33/773 |
| 8505175 | 11/1985 | WIPO . | |
| 90/00787 | 1/1990 | WIPO | 33/775 |

OTHER PUBLICATIONS

Advertisements for "Map Mate", (Date Unknown).
Advertisements for "Precision Map Meter", (Date Unknown).

*Primary Examiner*—Christopher W. Fulton
*Attorney, Agent, or Firm*—Browdy and Neimark

[57] ABSTRACT

A self-contained, electronic, hand-held scaler for a map or other illustration uses a rotary element and an optical sensor at its tip to generate digital pulses when the tip is moved over a map surface. The pulses are counted by a microprocessor that also operates on different pulse counts to automatically scale distances on the map. The microprocessor is supplied with the number of, eg., miles on the scale line of the map and the tip is then run over the length of the scale line; the processor uses the ratio of the number and the pulse count to scale an arbitrary distance on the map. A digital readout shows the scaled distance in, eg., miles corresponding to the line run over the map. The rotary element can be a wheel in an axle or a sphere held in a retainer, like a ball-point pen ball. The sensor has a lamp and photocell to generate pulses by a pattern of reflective and non-reflective areas on the rotary element. The housing has switches for resetting, calibrating, and initializing, a map-illuminating light. Battery power is cut off after long non-use.

20 Claims, 5 Drawing Sheets

OPTO-MECHANICAL INSTRUMENT TO ACCURATELY MEASURE LINEAR DISTANCES ON FLAT OR CURVED SURFACES

BACKGROUND OF THE INVENTION

1. Field of the Invention

The present invention relates to the construction and use of a self-contained, opto-mechanical instrument to accurately and rapidly measure linear distances on flat or curved surfaces.

2. Description of the Related Art

Historically, graphic representations of objects, illustrated in proper scale, have been extensively utilized in a wide variety of separate disciplines, such as geology, cartography, aerial photography, medical/industrial imaging, architectural/mechanical drawing, just to name a few. Consequently, the ability to perform precise linear distance measurements on these graphic representations is of significant value.

Various inventions capable of performing linear distance measurements have been described in German patents 3245864, 3025686, 3245864, Japanese Patents 55-36726, 58-101105, 60-36901, 1-191010, U.S. Pat. Nos. 4,760,647, 5,067,249, 5,161,313, 3,494,039, British Patent 2200754 and World Patent 85/05175. All of the devices depicted in these patents share several common features including:

1. a rotatable tracking wheel which is employed to trace the distance being measured;
2. mechanical or electronic conversion of tracking wheel movement into numerical values; and
3. device calibration in absolute units of measurement, e.g. inches, centimeters, etc.

In spite of these common design features, however, there are notable differences between the measurement capabilities of these inventions. Furthermore, each of these devices has significant design limitations which negatively impact their use in a variety of different measurement conditions.

These limitations generally fall into the following categories:

1. the integration of the measuring device into a single, portable unit;
2. the basic principle by which these devices perform distance measurements and the device calibration requirements;
3. the ability to select different linear units;
4. the ability to select different linear scales;
5. the complexity of device construction and use; and
6. the ability to perform accurate distance measurement of irregularly shaped lines.

1. Self-contained design: Certain of these inventions such as patents 3245864 and 3025686 cannot be considered as single, self-contained units, since the former is intended to operate in conjunction with a separate computer, and the latter requires two separate units (a counter unit and a pulse generator probe) which are made to operate together. On this basis, these patents do not possess the portability and size advantages offered by the self-contained devices.

2. Principles of Measurement: All of the previously identified devices measure distances in a single, absolute linear unit, e.g., inches, centimeters, etc. Of the devices which have multiple unit and scale capabilities, the measured distance (in this absolute unit) is then converted into the specific unit and scale of the illustration being measured. The absolute distance measurement principal adopted by these inventions therefore requires accurate device calibration for this linear unit, and maintenance of such calibration accuracy after prolonged use and under adverse conditions. Variation from this calibration state will necessarily result in inaccurate distance measurements.

3. Linear Unit Selection: patents 2200754, 2751620 and 4,760,647 only measure and display absolute linear units, e.g., inches or centimeters. Consequently, there are no provisions for the selection of linear units other than those for which the device has been calibrated. Other devices can only function to convert measured linear distances into a specific unit. For example, patents 3025686, 5,067,249, 3,494,039, 36901 and 0191010 display the distances between points on a map in miles or kilometers; and 36726 displays the unit price per length of raw materials. The application of these devices would therefore be highly restricted to specific distance determinations. Only patents 5,161,313, 85/05175, and 101105 appear to provide a means for selecting different units of measurement. However, even in these latter cases, this selection must be made from a limited list, i.e, the most commonly used units.

4. Linear Scale Selection: The provision for multiple scale selection (within a specified linear unit) differs widely in the prior art. Since patents 2200754, 2751620, 4,760,647 only function as electronic rulers, the devices cannot directly convert measured distances into different linear scales. Even if the devices are calibrated in the same units as the illustration, such conversion can only be achieved by an independent mathematical calculation. This, in turn, requires additional steps for each distance determination.

As previously mentioned patents 60-36901 and 5,067,249 only display distances in miles or kilometers. Furthermore, the use of these devices is additionally restricted by a limited number of selectable scales. Thus, these inventions are unable to measure distances on illustrations which are not of the same scale as the predetermined settings on the devices.

Finally, all of the previously described devices which have the capability to adjust for multiple linear scales shown in patents 5,161,313, 85/05175, 3,494,039, 0191010, 101105, 3245864 and 3025686, require that the operator know the specific scale of the illustration in absolute units, i.e., miles/inch, kilometers/centimeter, etc. On the other hand, many commonly used graphic representations, e.g. road maps, do not always define the calibration distance of the scale bar in absolute units of measure. In these cases, the operator must first perform separate measurements and calculations before the device can be mechanically or electronically adjusted for the proper illustration scale. Thus, if the calibration scale of the illustration is not represented in absolute units, distance measurement using all of these devices would require multiple operator procedures.

5. Complexity of Design and Use: The devices shown in patents 5,161,313 and 85/05175 offer the greatest flexibility in measuring different units and scales, but are highly complex in their construction and use. This is due to the fact that this invention measures distances in a single, absolute linear unit, and then mathematically converts measured distance values (in this unit) to other units and scales. Because of this method of measurement, the devices require a complex design to accommodate the manual selection of different units of measurement, as well as the manual entry of numerical scale information. Consequently, this invention must possess multiple function keys, as well as a complete numerical keyboard for data entry. Furthermore, the routine use of this device can be complicated and cumbersome. For example, a distance measurement using this invention would first require the operator to select a unit of measurement, e.g., inches, centimeters, kilometers, etc., from a predetermined and limited number of options. If the device does not possess the particular linear unit desired, e.g., microns, angstroms, etc., the distance measurement could not be readily performed. If unit selection is possible, the operator would then manually enter the numerical scale data, e.g., the number of miles per inch. However, if the absolute scale for instance miles per inch of the illustration is not shown (as is the case with many commonly used maps), the operator would first be required to perform an independent measurement and calculation to generate this scale data before it could be entered into the device. Thus, because of the basic method by which the previous art measures distances, i.e., in absolute units, increases in the device's capability to measure different units and scales, necessarily results in corresponding increases in the device's complexity of construction and use.

6. Distance Measurement of Irregularly Shaped Lines: One important consideration in the present art is a device's capability to measure distances along highly curved lines. This capability has, to a large extent, been determined by the size and shape of the device itself, the diameter of the tracking wheel, and restricted movement of the tracking wheel in a single axis of rotation.

Device size and shape are significant factors, since the ease with which an operator can hold and manipulate the device directly affects his ability to accurately trace a nonlinear line. In this regard, the dimensions of a common writing instrument would appear to provide the optimum size and shape characteristics for maximum operator control and manipulation. Although patents 5,161,313, 85/05175, 101105, 5,067,249, 36901, and 3,494,039 seem to meet the criteria for ease of device manipulation, the devices shown in patents 4,760,647, 2751620, 2200754 and 091010, do not suit this description. Consequently, these latter devices could not be readily utilized to precisely trace complex lines.

The tracking wheel diameter is an important consideration for two primary reasons. Firstly, a large diameter can cause visual obstruction of the surface being measured. This is an especially critical factor when short and highly irregular lines are being traced. Secondly, the diameter of the tracking wheel defines the degree of curvature (degrees of arc per unit length) of the wheel circumference. This degree of curvature, in turn, determines the extent of contact between the wheel and the illustration surface. Since accurate tracing can only be achieved if this contact length is smaller than the radius of curvature defined by the line, the devices which possess the smallest wheel diameters, also have the greatest potential for providing the most accurate tracing capabilities. In this connection, however, the mechanical or opto-mechanical methods used by patents 5,161,313, 85/05175, 101105, 5,067,249, 36901, and 3,494,039 severely limit the minimum wheel diameter which can be reasonably employed. Thus, these devices are restricted in their ability to accurately trace highly curved or irregularly shaped lines.

The utilization of a tracking wheel to trace lines can also lead to measurement inaccuracies. Specifically, since a wheel moves about a single axis of rotation, accurate line tracing requires that the wheel be positioned in a particular orientation relative to the line being traced. Consequently, patents 101105, 5,067,249, 36901, and 3,494,039, require that the operator manually align the tracking wheel to this orientation during distance measurements. In practical terms, the ability of the operator to maintain proper wheel orientation would be determined by the considerations previously discussed, i.e., the size and shape of the device, the degree of visual obstruction caused by the tracking wheel, and the extent of contact between the wheel and the illustration surface. Consequently, a device which could be easily manipulated in the hand, and which had a small wheel diameter relative to the curvature of the line, would provide the best potential for tracing highly complex lines.

In an attempt to eliminate this requirement for manual orientation, the devices shown in patents U.S. Pat. No. 5,161,313 and 85/05175 allow the tracking wheel to swivel in a plane perpendicular to the axis of wheel rotation, in a manner analogous to a common caster. Thus, movement of these devices in a specific direction causes the tracking wheel to align itself in the proper orientation relative to the line being traced. Although this design reduces the need for operator manipulation of the device, it also introduces a potential source of measurement inaccuracies. Specifically because of this design, the swiveling action of the caster, itself, will cause rotation of the measuring shaft (50), which, in turn, can result in extraneous pulse generation. This phenomenon could therefore lead to cumulative pulse counting errors during the tracing of irregularly shaped lines, where caster rotation would be the most pronounced.

Furthermore, caster movement of the tracking wheel does not eliminate the need for a small wheel diameter, since the operator must be capable of observing sudden changes in line direction in order to move the device in the appropriate direction.

In short, each of the previously described inventions has certain limitations relative to size, flexibility of unit/scale selection, complexity of design, and measurement accuracy in tracing highly complex lines. These limitations are primarily due to the optical or mechanical methods the devices use to translate tracking wheel movement into distance values, as well as the basic principle by which the devices measure distances in absolute linear units.

SUMMARY OF THE INVENTION

The claimed invention is a self-contained, opto-mechanical instrument to rapidly, precisely and accurately measure linear distances on flat or curved surfaces. In order to permit easy manipulation by one hand and facilitate accurate distance measurement, the invention's overall size and shape are comparable to a common writing pen. Distance is sensed by the use of either a tracking wheel or a tracking sphere, depending upon the particular version of the instrument. These tracking devices are collectively referred to as the tracking sensor, and can be manufactured of highly reflective material.

The tracking wheel has gear cogs along its entire circumference, and the spaces between the gear cogs are coated with an anti-reflective material.

The tracking sphere has regularly spaced pits or circumferential troughs engraved on its surface, and the bottoms of these pits or troughs are coated with anti-reflective material. One example of a regularly spaced pit pattern would include the "buckyball" configuration, in which the surface of the sphere is divided into regularly spaced pentagons and hexagons similar to a common soccer ball. ("Buckyball" is the nickname of a large molecule on which carbon atoms are disposed in an arrangement reminiscent of the geodesic domes of Buckminster Fuller.) The tracking wheel and sphere will operate in exactly the same manner if the prior reflective surfaces are coated with the anti-reflective material and the surfaces formly having the anti-reflective coating are left to be reflective. During distance measurement, the tracking sensor is made to trace along a specified path between points on an illustration. Rotation of the tracking sensor, as a consequence of movement across the illustration surface, is detected and digitized by a reflective optical switch which is positioned in direct view of the tracking wheel circumference or the tracking sphere surface. The digital pulses are then processed by a microprocessor, which in turn, causes the measured distance to be displayed on an LCD in the actual units represented on the illustration. Control of the microprocessor is accomplished by a reset key, a calibrate key, and an enter key. The instrument is battery powered, and to facilitate use under low ambient light conditions, the instrument provides for illumination of the immediate surface area being measured as well as the LCD display.

As discussed below, the construction and operation principles of this instrument eliminate the major limitations of the previously described technologies.

1. Self-contained design: The present instrument is entirely self-contained. It does not require external devices for either the determination or the numerical display of measured distances. Consequently, the invention can readily be utilized under "field conditions" without reliance upon additional hardware or software support.

2. Principles of Measurement: One extremely important and unique design feature of this invention is the method of measurement itself. Thus, rather than measuring absolute distances (as has been done in the past), the instrument measures relative distances by "ratio determination". Specifically, the digital pulse information derived from manually inputting the numerical value of a selected illustration scale bar, and thereafter inputting the digital pulse information derived from measurement of the selected scale bar is used to generate a mathematical ratio of pulses per unit distance. This ratio is then used to mathematically convert the pulse information obtained during a measurement into the correctly scaled distance.

The principle of "ratio determination" allows the accurate measurement of distance between points X and Y on an illustration without requiring instrument calibration to absolute units of measure.

Two additional advantages inherent in the method of "ratio determination" are: automatic compensation for changes in instrument characteristics which may occur over a period of time due to mechanical wear or environmental conditions; and automatic compensation for different operator measurement techniques. Compensation is achieved in the latter case, since both calibration and measurement are performed by the instrument operator.

In summary, the method of "ratio determination" employed by the present instrument provides clear advantages over previously described devices, in which variation from a preset calibration value will necessarily result in inaccuracy of measured distances.

3. Linear Unit Selection: Unlike previous technologies, the present invention has the capability of measuring all possible units of linear measurement. This is because this instrument measures illustration distances relative to the scale bar length. Consequently, the LCD indicator will always display numerical values in the same units as the scale bar, regardless of the linear units employed. Thus, for example, if the illustration is scaled in microns, the LCD will automatically display the measured values in microns. This capability eliminates a significant limitation of the previous technologies, i.e., that unit selection can only be made from a predefined number of possibilities; and if this unit cannot be selected, the measurement cannot be readily performed.

4. Scale Selection: Again, because of the "ratio determination" method used, the present invention is capable of measuring distances using an infinite number of linear scales. Furthermore, this measurement method also eliminates the requirement that the operator know a priori the scale of the illustration in absolute units of measurement.

5. Complexity of Design and Use: The present instrument is of extremely simple construction, being designed to require only a single moving part. Furthermore, because of the measurement principle employed, there is no need for numerous function keys and a complete numerical keyboard. Rather, this instrument utilizes only a reset key, a calibrate key and an enter key to perform all distance measurements. Thus, the present invention possesses the flexibility of measuring every possible linear unit and an infinite number of linear scales, without at the same time increasing the complexity of the design.

The use of this invention to measure illustration distances is also extremely simple. Calibration for any scale, and in any unit of measurement, is achieved by the operator manually rotating the tracking sensor until the number of units specified by the scale bar appears on the LCD. Once this value is displayed, the operator momentarily presses the calibrate key. The reset key is then momentarily pressed, and the operator traces the length of the scale bar. The operator then presses the enter key, which completes the calibration procedure. Once calibrated, only a single step is required for the instrument to measure any distance on the illustration. The operator simply traces a line between selected points, and the number appearing on the LCD, at any time during the measurement, represents the accumulated distance traversed up to that point of the measurement.

This ability to provide a continuous display of the accumulated distance becomes significant if, for example, the operator wishes to measure the respective distances on an illustration from points X to Y, and then from points X to Z on the same line. A continuous display of the accumulated distance allows this information to be obtained from a single tracing. Thus, the operator can trace from X to Y, note the distance registered on the LCD, continue tracing from points Y to Z, and then note the distance obtained at point Z. Devices which calculate distance after the tracing procedure would require two separate measurements, one between X and Y and a second between X and Z.

In a separate situation, it is frequently desirable to identify the point on an illustration which is a specific distance from another point on that illustration. If, for example, the operator wishes to define the point on a road map which is 125 miles from another point. A continual mileage readout will allow the operator to trace the map route until 125 miles appears on the LCD. This point on the map corresponds to the desired distance. On the other hand, devices which only display the final calculated distance do not possess this capability.

In summary, the present instrument is simply constructed and designed to measure distances by a simple procedure. In addition, this invention provides a direct readout of distance in the appropriate units of measure, as well as a continuous readout of the accumulated distance units during the measurement. Finally, once instrument calibration for a particular illustration has been performed, the calibration data is stored in microprocessor memory, even when the power switch is in the "off" position. This capability eliminates the need for recalibration in future distance determinations on the same illustration or on an illustration with an equivalent scale.

6. Distance Measurement of Irregularly Shaped Lines: The present invention employs two significant design concepts which eliminate the limitations of other devices in measuring irregularly shaped lines: a) the method utilized for optical detection of linear distances; and b) the use of a spherical tracking sensor.

Method of optical detection: Of the described technologies in patents 3245864, 36726, 2200754, 2751620, 4,760,647, 3025686, 60-36901, 5,067,249, 5,161,313, 3,494,039, 0191010 and 101105, only the present invention performs distance measurements using reflective optical sensing. Specifically, this instrument positions a reflective optical switch to view reflective areas on the circumference of the tracking wheel or on the surface of the tracking sphere. This particular orientation of the optical switch relative to the tracking sensor is defined as an "in line" configuration. The combined use of optical reflectance sensing and an "in line" viewing configuration provides two significant advantages over the optical transmission methods described in patents 2200754, 6036901, 5,067,249, 5,161,313 and 85/05175.

The first advantage relates to the diameter of the instrument itself, especially at the tapered end of the device. Unlike transmission switches, reflective switches are not required to "straddle" the optical disk. Consequently, an "in line" configuration permits the instrument diameter to be reduced to a size no greater than that of a common writing pen. This is an important consideration, since as previously mentioned, the ease with which an operator can hold and manipulate the device has a direct bearing on his ability to accurately trace a measured distance.

The second significant advantage of employing an "in line" configuration and reflective optical sensing is that a tracking wheel with a far smaller diameter (than previously described devices) can be utilized. This reduction in wheel diameter decreases both the visual obstruction of the surface being measured as well as the "wheel to illustration" contact length.

Spherical tracking sensor: Unlike the inventions of the identified patents, the present instrument can also utilize a spherical tracking sensor to measure linear distances. Since a sphere has the capability to uniformly move about all axes of rotation, the tracking sphere will generate electrical pulses regardless of the direction in which the instrument is moved. Consequently, the use of a tracking sphere eliminates the need to position the device in a specific orientation (relative to the axis of the line) during distance measurement.

The design concepts incorporated into the present device therefore allow for a reduction in both the instrument size and tracking wheel size. In addition, this instrument also has the capability of utilizing a spherical tracking sensor. Taken together, these improvements eliminate the limitations of the previously described devices, and significantly enhance the operator's ability to trace highly irregular lines.

In summary, the present invention has the following characteristics:

1. Small, lightweight and self-contained design.
2. Simple construction with only one moving part.
3. Reflective optical sensing.
4. Ratio measurement of measured distances.
5. Autoselection of all possible units of linear measurement.

Autocalibration to an infinite number of linear scales.

7. Use of either a tracking wheel or a tracking sphere for distance measurement.
8. No requirement for calibration in absolute linear units.
9. No requirement for knowledge of absolute linear scale of illustration.
10. No requirement for a numerical keyboard.
11. No requirement for numerical data entry.
12. Long-term storage of calibration data.
13. Continuous digital readout of measured distances.
14. Capability to measure distance on highly curved lines.
15. Illumination of the illustration.
16. Illuminated digital display
17. Automatic power shutoff.
18. High precision and accuracy.

DETAILED DESCRIPTION OF THE PREFERRED EMBODIMENTS

Figure 1A:
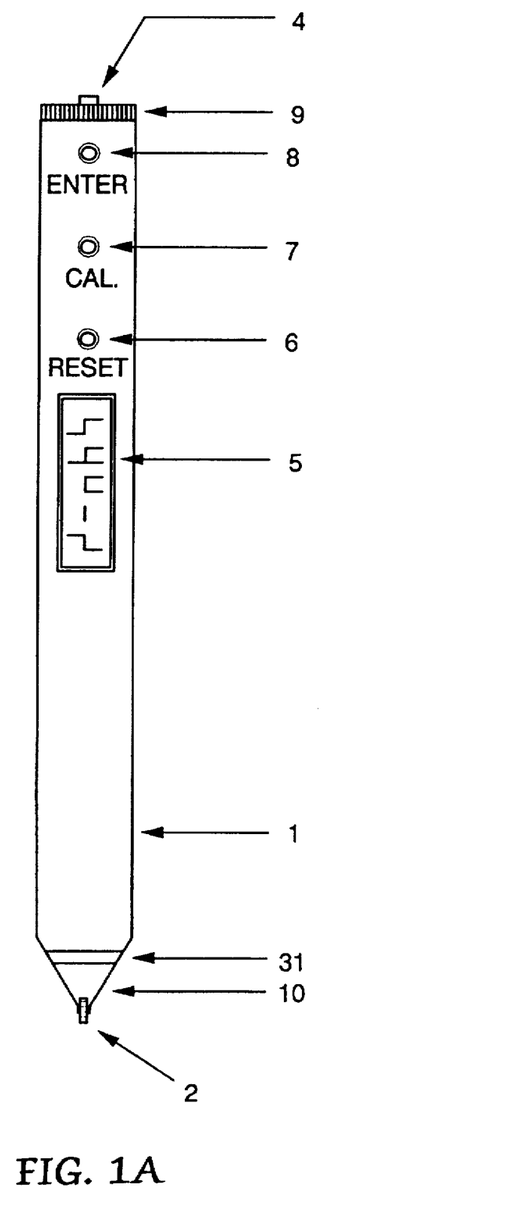
FIGS. 1A and 1B illustrate the front exterior view of two embodiments of the measurement instrument according to the invention respectively using a tracking wheel and a tracking sphere to trace distances.
Figure 1B:
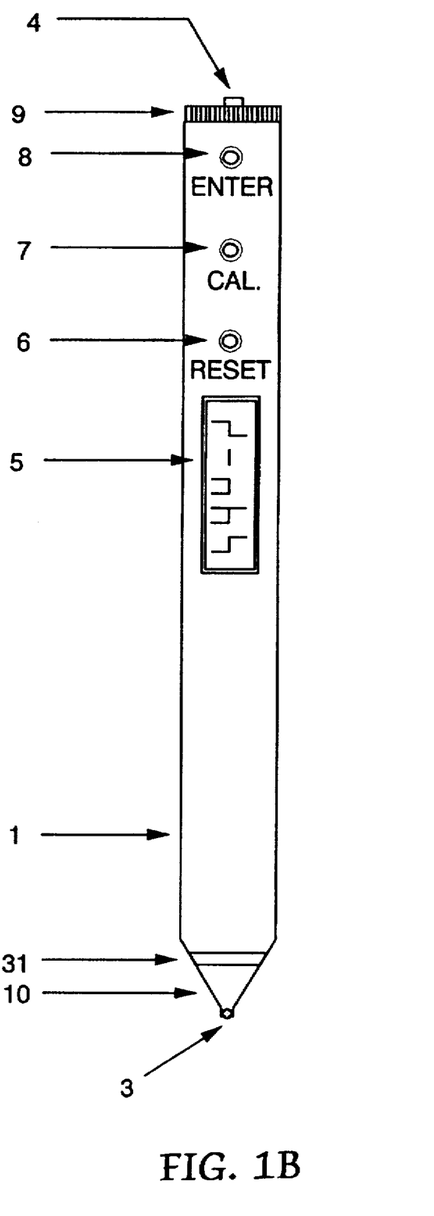

The figures will now be described in detail according to the number of each element. FIGS. 1A and 1B show the front exterior plan of the tracking wheel version and the tracking sphere version, respectively of the measurement devices according to the invention. The external components of these instruments include a cylindrical housing 1 which is tapered inwardly at one end 10. The tapered end 10 supports a rotatable tracking wheel 2 or rotatable tracking sphere 3. A power switch 4 is used to apply internal battery power to the instrument electronics. Distances are digitally displayed by an LCD 5, and the LCD display is cleared by a reset key 6. Instrument calibration is accomplished by the use of a calibration key 7 and an enter key 8. An illumination switch 9 applies power to a lamp in the LCD display and a lamp 21 (See FIGS. 4A and 4B) housed adjacent to the transparent illumination window 31.

Figure 2A:
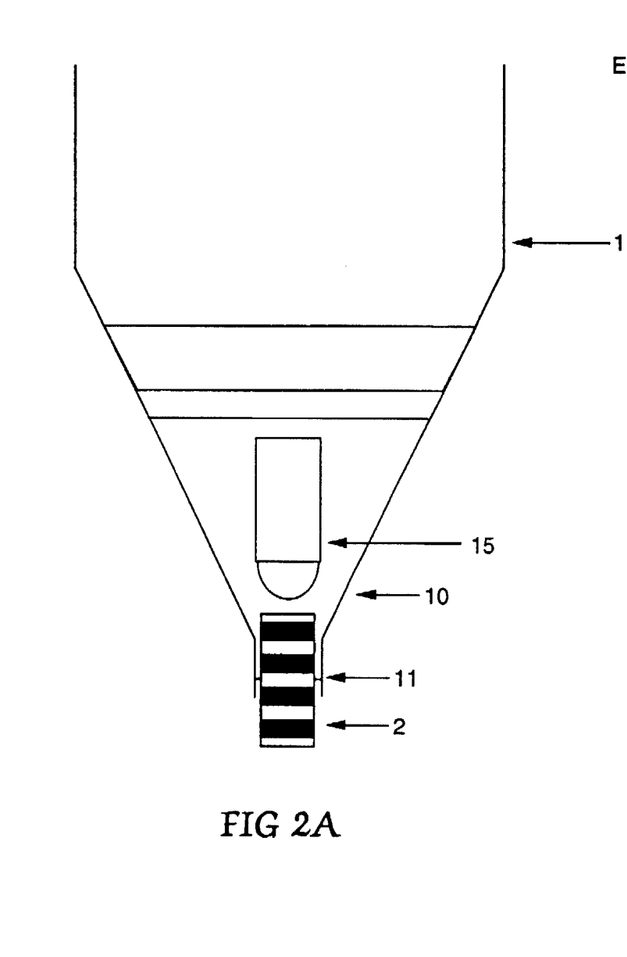
FIG. 2A illustrates a longitudinal section and mechanics of the measurement instrument of FIG. 1A.
Figure 2B:
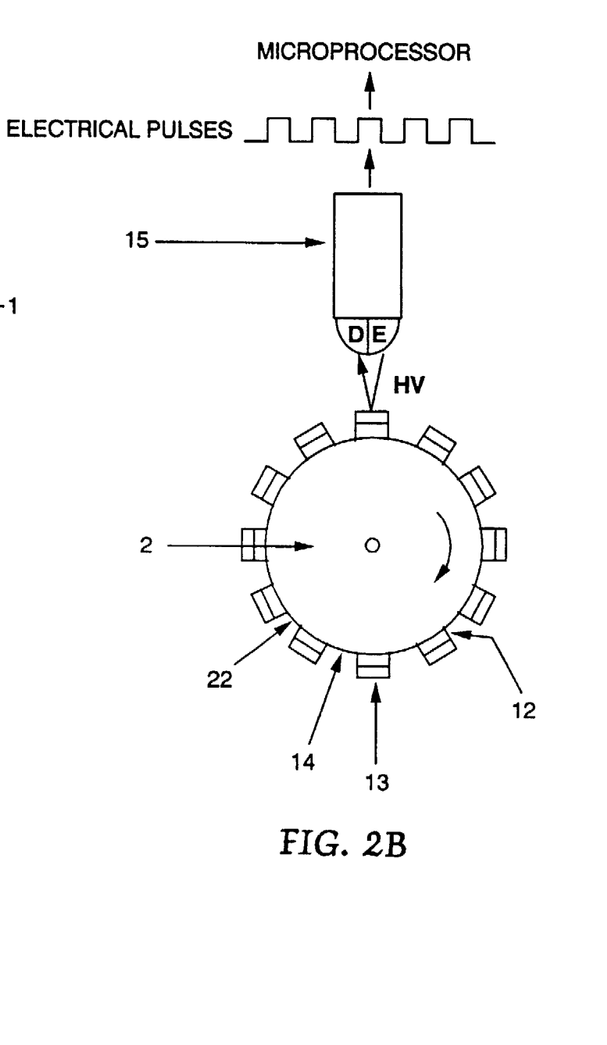
FIG. 2B illustrates the measurement instrument of FIG. 1A using reflective optical sensing.

FIG. 2A illustrates a cross section and the mechanics of the tracking wheel version. In this version, the tapered end 10 supports a rotatable tracking wheel 2 which is carried on an axle 11 between opposite sides of the housing. The tracking wheel 2 (FIG. 2B) has gear cogs 12 with highly reflective surfaces 13 along its entire circumference. The wheel surfaces 14 between the gear cogs 12 are coated with an anti-reflective material 22. A reflective optical switch 15 is positioned with its longitudinal axis perpendicular to axis 11 of the tracking wheel 2 and in direct view of the tracking wheel gear cogs 12. The reflective optical switch 15 is made to incorporate a light emitter (E) and light detector (D) in the same case. Rotation of the tracking wheel 2 (as a consequence of movement across an illustration surface) causes the gear cogs 12 to sequentially pass in view of the reflective switch. The reflective surfaces 13 of the gear cogs are detected by the optical switch 15 as they pass during rotation to generate a series of electrical pulses.

Figures 3A, 3B:
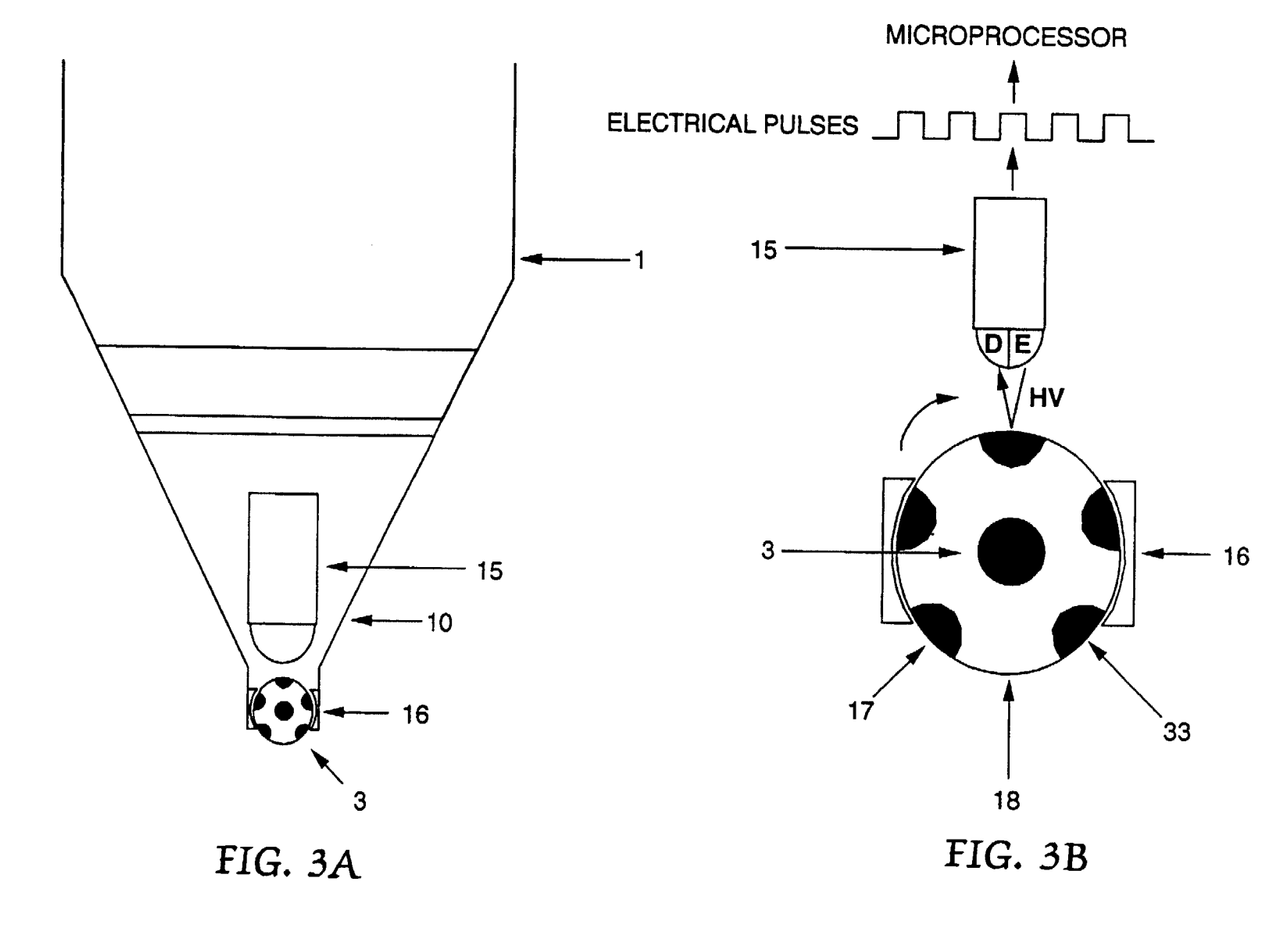
FIG. 3A illustrates a longitudinal section and mechanics of the measurement instrument of FIG. 1B.
FIG. 3B illustrates the measurement instrument of FIG. 1B using reflective optical sensing.

FIG. 3A illustrates a cross section and the mechanics of the tracking sphere version. In this version, the tapered end 10 supports a rotatable tracking sphere 3 which is carried in a retaining socket 16 supported by the sides of the housing. The tracking sphere 3 (FIG. 3B) is manufactured of a highly reflective material and has regularly spaced depressions 17 or circumferential troughs engraved on its surface. The bottoms of these depressions or troughs are coated with an anti-reflective material 33. A reflective optical switch 15 is positioned so that its longitudinal axis passes through the center of the tracking sphere 3 and in direct view of the highly reflective tracking sphere surface 18. Rotation of the tracking sphere 3 in any direction causes the anti-reflective depressions 17 or troughs to sequentially pass in view of the reflective switch 15 resulting in the generation of electrical pulses.

Figure 4A:
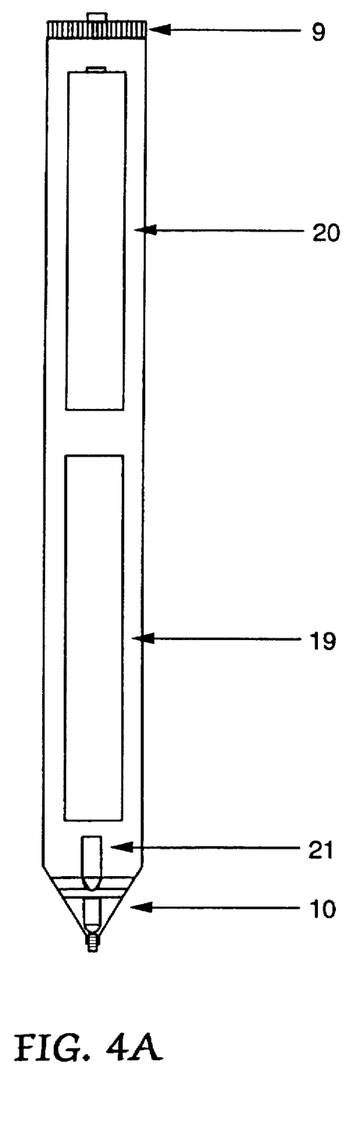
FIG. 4A illustrates a plan view of a longitudinal section of the measurement instrument of FIG. 1A.
Figure 4B:
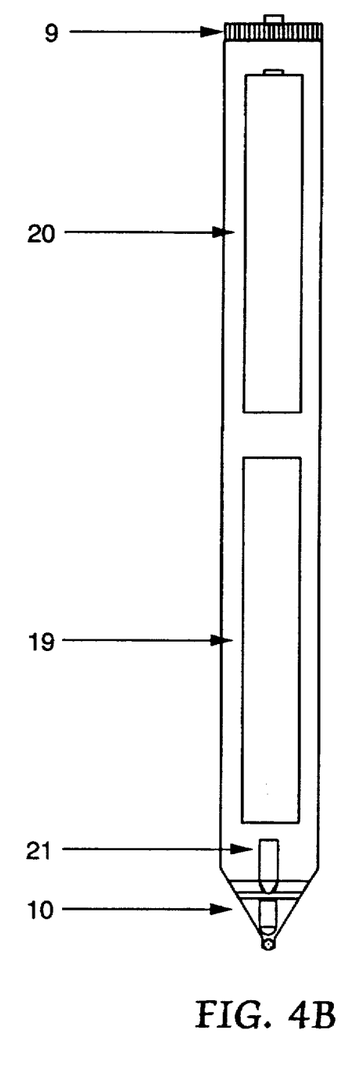
FIG. 4B illustrates a plan of a longitudinal section of the measurement instrument of FIG. 1B.

FIGS. 4A and 4B show the plan and a longitudinal cross-section of the tracking wheel version and the tracking sphere version, respectively. The electrical pulses generated as a consequence of tracking sensor movement are processed by a microprocessor 19. The instrument is powered by a self-contained battery 20, and an illumination lamp 21 is positioned at the tapered end 10 of the instrument housing. As previously mentioned, activation of this lamp is achieved by an illumination switch 9.

Figure 5:
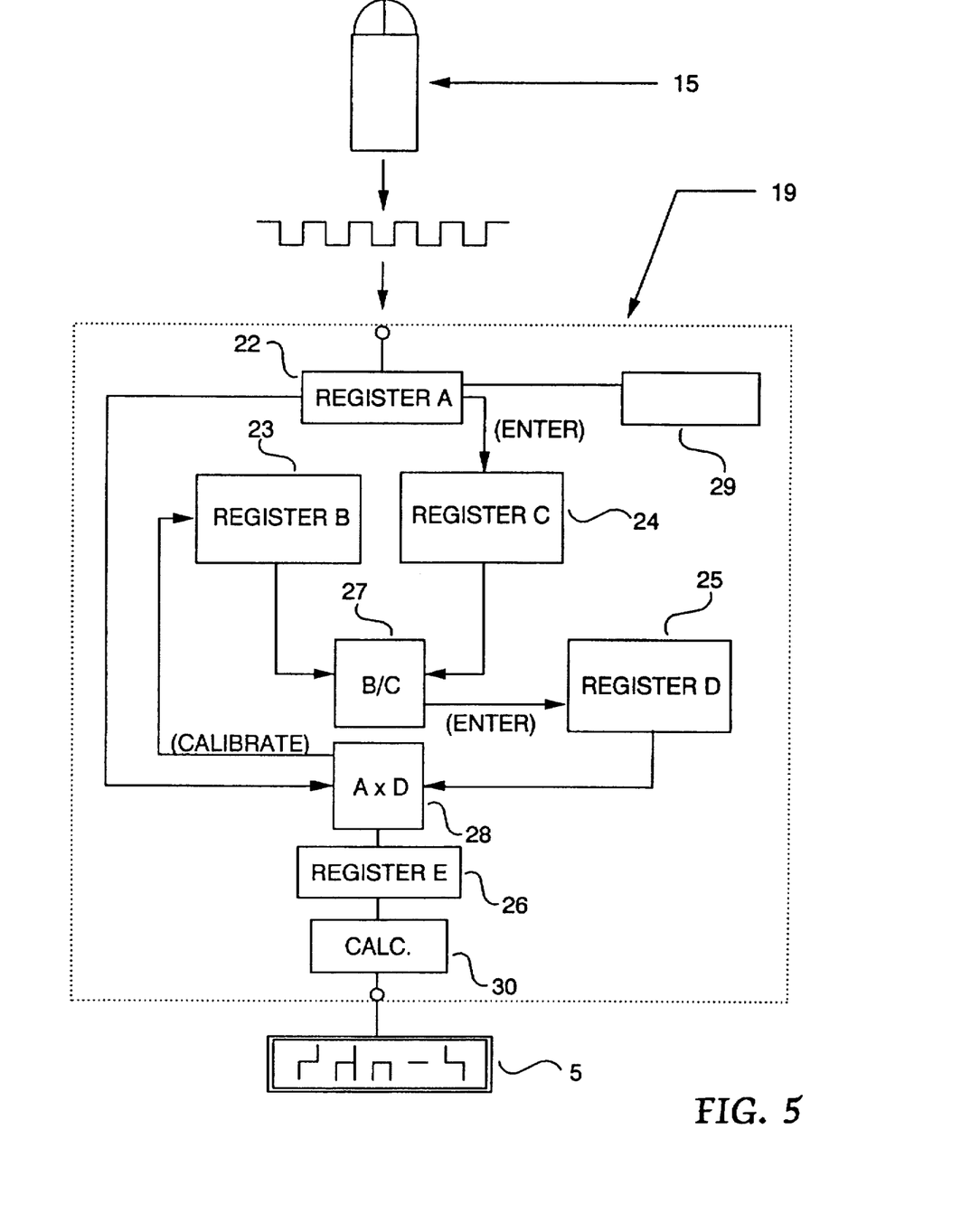
FIG. 5 illustrates the microprocessor for processing digital pulse information into correctly scaled distance units of the measurement instrument of FIGS. 1A and 1B.

FIG. 5 illustrates the major elements of a version of microprocessor which is used in the present invention. This microprocessor contains a number of counting registers A (22), B (23), C (24), D (25) and E (26). The microprocessor also contains division circuitry 27, which divides the value of register B by the value of register C, i.e. B/C (27), and multiplication circuitry 28, which multiplies value of register A by the value of register D, i.e., A×D (28), and sensing circuitry (29), which detects periods of instrument non-use. Specifically, the sensing circuit monitors the pulse number accumulated in register A. If this number remains constant for more than a three minute period, power to the instrument is automatically interrupted.

During calibration and distance measurement, the numerical values of the counting registers are controlled by movement of the tracking sensor as well as the reset, calibrate and enter keys. Specifically, movement of the tracking sensor causes electrical pulses to be generated by the optical switch. These pulses are counted in register A. At one point during calibration, the product of register A times register D, i.e. A×D (28), is downloaded to register B by pressing the calibrate key. This pulse number in register B is defined as $P_{Track}$. At another point during calibration, the pulse count in register A is downloaded to register C by pressing the enter key. This pulse number in register C is defined as $P_{Scale}$. Each 100 milliseconds, the microprocessor divides the pulse number in register B by the pulse number in register C, i.e. $B/C=P_{Track}/P_{Scale}$ (27). The resulting pulse ratio, defined as $C_{Ratio}$, is downloaded to register D by pressing the enter key. During the tracing of distance between two points on an illustration, the pulse number accumulated in register A is defined as $P_{measure}$. Each 100 milliseconds, the microprocessor multiplies the pulse number in register A by the numerical value of register D (A×D), and downloads this product to register E. For example, during a distance determination the pulse number in register A ($P_{measure}$) is multiplied by the value of register D ($C_{Ratio}$), and the product of this calculation, i.e., the correctly scaled distance (CSD) is stored in register E. The LCD, in turn, displays the numerical value present in register E at any given time. This numerical value is updated every 100 milliseconds.

The number in register E, corresponding to distance, will usually be the number that is desired by the user and the number that is displayed on the display 5. However, in some applications it is not the distance that is most useful, but rather a mathematical function of the distance. For example, earthquake wave energy is a function of distance from an epicenter. In such cases a mathematical function of the distance can be displayed. For the earthquake, the energy at a point could be displayed merely by rolling the instrument away from the epicenter and viewing the display. Exponential and logarithmic functions are especially useful.

The present invention includes a calculation means 30, shown in FIG. 5 between the register 26 (E) and the display 5. It is to be understood that when reading distances the calculation means 30 merely passes through the distance readings from the register 26 to the display 5; but non-trivial functions can be selected for the calculation means 30 that produce a quantity to be displayed on the display 5 that is not equal to the value of register 26.

The calculation means may be a simple electrical connection for distance reading-only instruments; it may be part of the microprocessor 19 and perform the desired calculations in the conventional manner, by program; it may also be a hard-wired calculating circuit. The instrument may include controls or programming means (not shown) that permit switching from straight distance displays to quantities calculated from the value in register 26.

In order to accommodate first time calibration of the instrument or recalibration of the instrument for different scales, the numerical values in registers A, B, C and D are set to specific numbers under certain conditions, e.g., insertion of the battery and activation of the power switch. For example, insertion of the battery causes register D to be set at D=1. Activation of the power switch sets register A=0, and sets register B=1 and C=1. During "power on" conditions, register D retains the last numerical information downloaded, i.e., D=1 or D=$C_{Ratio}$. Pressing the reset key sets register A=0, but does not change the numerical values in registers B, C and D. Finally, the last numerical value of $C_{Ratio}$ downloaded to register D is maintained in memory when power to the microprocessor is interrupted by the power switch.

A typical calibration and distance measurement procedure can be summarized as follows. First, power to the instrument is applied and a linear distance represented on the illustration scale bar is selected, e.g. 50 miles, and the tracking sensor is manually rotated until the number appearing on the digital display equals this specific number, i.e., 50. The pulse information generated in response to this movement of the tracking sensor is stored in memory as ($P_{Track}$), and the tracking sensor is then rolled over the length of the scale bar equivalent to the distance selected, in this case 50 miles. The number of digital pulses ($P_{Scale}$) generated by this procedure is also stored in memory. The microprocessor then divides $P_{Track}$ by $P_{Scale}$ and stores this calibration ratio ($C_{Ratio}$) in memory. During distance determination, the microprocessor counts the pulse number ($P_{Measure}$) generated by tracing the distance between two points on the illustration, and automatically multiplies this pulse number ($P_{Measure}$) by the calibration ratio ($C_{Ratio}$). The product of this calculation equals the correctly scaled distance (CSD) between the two points on the illustration. CSD is then stored in memory and is continually displayed on the LCD. Both $C_{Ratio}$ and CSD are updated every 100 milliseconds. In addition, since the ratio ($C_{Ratio}$) remains in memory, even when power to the instrument is interrupted by the "on-off" switch, the instrument remains in calibration for later measurements on the same illustration (or on an illustration with an equivalent scale). Finally, if a three minute time period passes without movement of the tracking sensor, power to the instrument is automatically interrupted.

As previously mentioned, the distance measuring accuracy of other technologies is directly dependent on factory calibration of the device to an absolute unit of measurement, as well as maintenance of this specific calibration state during the lifetime of the device. However, the principle of "ratio determination" utilized by the present instrument completely eliminates these limitations. This is because the instrument is used to calibrate itself (relative to the length of the scale bar) prior to the distance measurement. Consequently, the number of digital pulses which are generated per revolution of the tracking sensor can vary from instrument to instrument, or during the lifetime of a given instrument, without in any way affecting the accuracy of the measurement.

Consider, for example, an instrument according to the invention (not shown) which is used to measure distances between points X and Y on a specific illustration.

Instrument "A" Characteristics:

Tracking sensor circumference=0.25 inches

Pulse number per revolution of tracking sensor=10 pulses

Illustration Characteristics:

Scale bar=80 units

Scale bar=2.65 inches

Distance X to Y=1.35 inches

First time calibration of this instrument after battery insertion would involve rotating the tracking sensor to generate a number on the LCD which is equal to a number represented on the scale bar, e.g. 80 units. Generation of this number (80) would require 8.0 revolutions of the tracking sensor, i.e., 80 pulses divided by 10 pulses/revolution=8.0 revolutions. This pulse number (80) would be stored in memory as $P_{Track}$. The tracking sensor would then be made to trace the length of the scale bar, which can be any arbitrary number, but for the purposes of this example will be defined as 2.65 inches. With a tracking sensor circumference 0.25 inches, 10.6 revolutions of the tracking sensor would be required to traverse the length of scale bar, i.e., 2.65 inches divided by 0.25 inches per revolution=10.6 revolutions. The number of pulses generated from measurement of the scale bar would therefore be 106, i.e., 10.6 revolutions x 10 pulses/revolution=106 pulses. This pulse number would be stored in memory as $P_{Scale}$, and divided into $P_{Track}$. The resulting calibration ratio ($C_{Ratio}$) would therefore be 0.755, i.e., 80 pulses divided by 106 pulses= 0.755. This calibration ratio ($C_{Ratio}$) would in turn be stored in memory and used to normalize all subsequent distance measurements performed on this particular illustration.

If for example, the actual distance between two points (X and Y) on this illustration was 1.35 inches, tracing this distance would result in 5.4 revolutions of the tracking sensor, i.e., 1.35 inches divided by 0.25 inches/revolution= 5.4 revolutions; and 5.4 revolutions would correspond to 54 pulses, i.e., 10 pulses/revolution×5.4 revolutions=54 pulses. This pulse number (54) is defined as $P_{Measure}$. Multiplication of $P_{Measure}$ =54 by ratio $C_{Ratio}$=0.755 yields the correctly scaled distance (CSD) of 40.8 units on the LCD. Thus, the distance measured by instrument "A" is 40.8 units.

Now as an extreme example, consider another instrument according to the invention (not shown) which, due to certain manufacturing variables, has a different tracking sensor diameter and generates a different pulse number per revolution of the tracking sensor. The distance measured by instrument "B" between the same two points X and Y would be as follows.

Instrument "B" Characteristics:

Tracking sensor circumference=0.28 inches

Pulse number per revolution of tracking sensor=16 pulses

Illustration Characteristics:

Scale bar=80 units

Scale bar=2.65 inches

Distance X to Y=1.35 inches

Distance measurement:

$P_{Track}$=80 pulses

Number of revolutions to trace the length of the scale bar=2.65 inches/0.28 inches per revolution=9.46 revolutions $P_{Scale}$=9.46 revolutions×16 pulses/revolution =151 pulses $C_{Ratio}=P_{Track}/P_{Scale}$=80 pulses/151 pulses=0.530

Distance X to Y=1.35 inches divided by 0.28 inches/revolution=4.82 revolutions

Distance X to Y=4.82 revolutions×16 pulses/revolution= 77 pulses=$P_{Measure}$

Correctly Scaled Distance (CSD) measured by instrument "B"=$P_{Measure \times CRatio}$=77×0.530=40.8 units Thus, even though instruments "A" and "B" have significantly different tracking wheel diameters and generate different pulse numbers per revolution of the tracking sensor, they measure identical distances between points X and Y on the illustration, i.e., 40.8 distance units. It is also apparent that these units of measurement are defined by the illustration scale bar itself. Thus, if the illustration is scaled in kilometers, the LCD 5 automatically displays values in kilometers. The same would be true for any unit of measurement represented on any given illustration.

Furthermore, the illustration scale used in this example was defined to be 80 units/2.65 inches, or 30.19 units/inch. Therefore, a 1.35 inch distance between points X and Y actually represents 30.19 units/inch×1.35 inches=40.8 units. This actual distance (40.8 units) is identical with the distance measured by both instruments "A" and "B" (40.8 units). Consequently, the principal of "ratio determination" allows the accurate measurement of distance between points X and Y without requiring instrument calibration to absolute units of measure.

What is claimed is:

1. A tracking device for determining a scalable distance over a surface, the device comprising:

a rotary element adapted to frictionally contact the surface;

a sensor for generating pulses in proportion to a rotation of the rotary element;

counting means for storing a count of pulses in a first register;

first enter means for downloading the count from the first register to a third register;

dividing means for dividing a second register by a third register to yield a numerical ratio;

second enter means for downloading the ratio to a fourth register;

multiplying means for multiplying the count by the fourth register to yield a numerical product;

calibrate means for downloading the product to the second register;

display means for displaying the product;

first reset means for setting the first register to zero;

second reset means for setting the first register to zero, setting the second register to one, and setting the third register to one; and initializing means for setting the fourth register to one;

whereby to scale a distance on a surface the fourth register may be set to one with initializing means, the rotary element may be turned to input into the first register a track number, the multiplying means may yield the numerical product equal to the track number, the track number may be downloaded into the second register with the calibrate means, the rotary element may be run over a scale illustration corresponding to the distance scale number to input into the first register a scale number, the first enter means may download the scale number into the third register, the dividing means may yield the numerical ratio equal to the track number over the scale number, the second enter means may download the ratio to a fourth register, the rotary element may be run over an arbitrary line on the surface, the multiplying means may yield the numerical product equal to the count times the ratio, and the display means may display the numerical product, the numerical product being a scaled distance over the surface corresponding to the arbitrary line.

2. The tracking device according to claim 1, wherein the dividing means and the multiplying means function repeatedly and automatically.

3. The tracking device according to claim 1, wherein the device is electrically powered and further comprises:

means for automatically shutting off electrical power to the device; and resetting means for setting the second register equal to one and setting the third register equal to one when power is re-applied to the device.

4. The tracking device according to claim 1, wherein the device is electrically powered and further comprises:

retention means for maintaining a last-held value in the fourth register when power is reapplied to the device;

whereby the device may be used without reinitializing when power is reapplied.

5. The tracking device according to claim 1, wherein the counting means, the dividing means, the multiplying means, the first register, the second register, the third register, and the fourth register further comprise a microprocessor.

6. The tracking device according to claim 1, wherein the rotary element includes first areas and second areas, the sensor is disposed proximal the rotary element, and the sensor generates pulses depending on proximity to selectively the first areas and the second areas.

7. The tracking device according to claim 6, wherein the rotary element further comprises a wheel rotatable on an axle, the wheel circumferentially including alternatingly a one of the first area and a one of the second area.

8. The tracking device according to claim 6, wherein the rotary element further comprises a sphere rotatably held within a retaining socket, the sphere including a pattern of the first area and the second area, the pattern such that the rotation of the sphere about an arbitrary axis disposes proximal the sensor alternatingly a one of the first area and a one of the second area.

9. The tracking device according to claim 1, wherein the rotary element includes reflective areas and non-reflective areas, the sensor includes a light source and photocell, and the sensor is disposed proximal the rotary element and distal the surface.

10. The tracking device according to claim 9, wherein the rotary element further comprises selectively:

a wheel rotatable on an axle, the wheel circumferentially including alternatingly a one of the reflective area and a one of the non-reflective area; and a sphere rotatably held within a retaining socket, the sphere including a pattern of the reflective area and the non-reflective area, the pattern such that the rotation of the sphere about an arbitrary axis disposes proximal the sensor alternatingly a one of the reflective area and a one of the non-reflective area.

11. The tracking device according to claim 10, wherein the pattern is a buckyball pattern.

12. The tracking device according to claim 1, including an elongate housing, a battery space disposed within the housing, and a display on an exterior of the housing.

13. The tracking device according to claim 12, further comprising a lamp for illuminating the surface and a lamp switch for activating the lamp.

14. The tracking device according to claim 12, further comprising at least one manual switch for activating at least one function associated with the group consisting of the first enter means, second enter means, the first reset means, the second reset means, the calibrate means, and the intializing means.

15. The tracking device according to claim 1, further comprising means for displaying on the display means a quantity calculated as a mathematical function of the numerical product.

16. A process of scaling an arbitrary line on a surface having a scale illustration, the scale illustration having a scale illustration length; the process comprising:

providing a microprocessor adapted to count pulses and to divide, multiply, and store numbers in at least one memory;

providing a rotary element adapted to frictionally contact the surface;

providing a sensor for generating pulses in proportion to a rotation of the rotary element and sending the pulses to the microprocessor;

providing a track number to the microprocessor;

running the rotary element over the scale illustration on the surface to provide a first pulse count to the microprocessor, the first pulse count equal to a scale number such that the scale illustration length corresponds to the scale number;

dividing the track number by the scale number in the microprocessor to yield a ratio;

running the rotary element over the arbitrary line on the surface to provide a second pulse count to the microprocessor, the second pulse count equal to a measure number;

multiplying the ratio by the measure number to yield a correctly scaled distance; and outputting a correctly scaled distance.

17. The process according to claim 16, further comprising the step of resetting memories of the microprocessor.

18. The process according to claim 17, further comprising the steps of:

providing a housing:

providing at least one reset switch;

providing a display:

mounting in the housing the microprocessor, the rotary element, the sensor, the at least one reset switch, and the display; and displaying on the display the correctly scaled distance.

19. The process according to claim 16, wherein the rotary element is selectively a cylindrical roller mounted on an axle and a sphere held within a retaining socket.

20. The process according to claim 19, wherein the rotary element includes reflective areas and non-reflective areas, the sensor includes a light source and photocell, and the sensor is disposed proximal the rotary element and distal the surface.

* * * * *